US008978408B2

(12) United States Patent
Sedlak et al.

(10) Patent No.: US 8,978,408 B2
(45) Date of Patent: Mar. 17, 2015

(54) LIQUEFIER FOR A HEAT PUMP AND HEAT PUMP

(75) Inventors: Holger Sedlak, Lochhofen/Sauerlach (DE); Oliver Kniffler, Sauerlach (DE)

(73) Assignee: Efficient Energy GmbH, Sauerlach (DE)

( * ) Notice: Subject to any disclaimer, the term of this patent is extended or adjusted under 35 U.S.C. 154(b) by 1203 days.

(21) Appl. No.: 12/935,756

(22) PCT Filed: Mar. 30, 2009

(86) PCT No.: PCT/EP2009/002315
§ 371 (c)(1),
(2), (4) Date: Jan. 21, 2011

(87) PCT Pub. No.: WO2009/121549
PCT Pub. Date: Oct. 8, 2009

(65) Prior Publication Data
US 2011/0107789 A1 May 12, 2011

(30) Foreign Application Priority Data

Apr. 1, 2008 (DE) .......................... 10 2008 016 663

(51) Int. Cl.
*F25B 1/10* (2006.01)
*F25B 39/04* (2006.01)
(Continued)

(52) U.S. Cl.
CPC . *F25B 39/04* (2013.01); *F24D 3/08* (2013.01); *F24D 3/18* (2013.01); *F24D 11/0214* (2013.01);
(Continued)

(58) Field of Classification Search
CPC ..... F24D 3/18; F24D 17/02; F25B 2400/072; F25B 2339/047; F24H 1/38; Y02B 30/126; Y02B 30/12

USPC ........... 62/6, 98, 260, 238.6, 238.7, 434, 498; 237/13, 28; 165/62
See application file for complete search history.

(56) References Cited

U.S. PATENT DOCUMENTS 2,575,325 A * 11/1951 Ambrose et al. ................ 62/181
3,712,075 A * 1/1973 Smith et al. ..................... 62/123
(Continued)

FOREIGN PATENT DOCUMENTS

DE 7816917 U1 10/1978
DE 7816917 U1 * 12/1978 ................ F24H 4/04
(Continued)

OTHER PUBLICATIONS

International Search Report and Written Opinion, mailed Aug. 13, 2009, in related PCT patent application PCT/EP2009/002315, 13 pages.
(Continued)

*Primary Examiner* — Frantz Jules
*Assistant Examiner* — Emmanuel Duke
(74) *Attorney, Agent, or Firm* — Michael A. Glenn; Perkins Coie LLP (57) ABSTRACT

A liquefier for a heat pump includes a liquefier space and a process water tank. The process water tank is arranged within the liquefier space such that it is substantially surrounded by liquefied working fluid. A wall of the process water tank, however, is spaced from a wall of the process water tank so that a gap formed to communicate with the region of the heat pump in which compressed gas is present is obtained, so that the process water tank is thermally insulated from the space for liquefied working fluid via this gas-filled gap. The liquefier itself may also be surrounded by the gas region, in order to provide for inexpensive insulation of the liquefier.

22 Claims, 7 Drawing Sheets

(51) Int. Cl.
*F24D 3/08* (2006.01)
*F24D 3/18* (2006.01)
*F24D 11/02* (2006.01)
*F24D 17/02* (2006.01)
*F24J 3/00* (2006.01)
*F25B 30/06* (2006.01)

(52) U.S. Cl.
CPC . *F24D 17/02* (2013.01); *F24J 3/00* (2013.01); *F25B 1/10* (2013.01); *F25B 30/06* (2013.01); *F25B 2339/047* (2013.01); *F25B 2400/072* (2013.01); *F25B 2500/01* (2013.01); *Y02B 30/12* (2013.01); *Y02B 30/126* (2013.01)
USPC .......................................................... 62/498

(56) References Cited

U.S. PATENT DOCUMENTS

| | | | | |
|---|---|---|---|---|
| 4,194,368 A | * | 3/1980 | Bahel et al. | 62/238.6 |
| 4,406,138 A | * | 9/1983 | Nelson | 62/305 |
| 4,517,799 A | * | 5/1985 | Hanaoka et al. | 62/323.1 |
| 4,852,366 A | * | 8/1989 | Harris | 62/238.6 |
| 4,984,628 A | * | 1/1991 | Uchida et al. | 165/256 |
| 5,220,807 A | * | 6/1993 | Bourne et al. | 62/238.6 |
| 5,509,466 A | * | 4/1996 | McQuade et al. | 165/113 |
| 5,573,182 A | * | 11/1996 | Gannaway et al. | 237/2 B |
| 2004/0140082 A1 | * | 7/2004 | Hua | 165/47 |
| 2004/0144528 A1 | * | 7/2004 | Kunimoto et al. | 165/298 |
| 2007/0245759 A1 | * | 10/2007 | Sedlak et al. | 62/260 |
| 2010/0147965 A1 | | 6/2010 | Sedlak | |
| 2011/0100032 A1 | | 5/2011 | Sedlak et al. | |
| 2011/0146316 A1 | | 6/2011 | Sedlak et al. | |

FOREIGN PATENT DOCUMENTS

| | | | |
|---|---|---|---|
| DE | 2827166 | 1/1980 | |
| DE | 2827166 A1 * | 1/1980 | ............. F24D 11/02 |
| JP | 08-233408 | 9/1996 | |
| JP | 08-261601 | 11/1996 | |
| JP | 2010518348 | 5/2010 | |
| JP | 2011-511241 | 4/2011 | |
| JP | 2011-525607 | 9/2011 | |
| WO | WO2007/118482 | 10/2007 | |

OTHER PUBLICATIONS

English Translation of Office Action mailed Mar. 17, 2009 in related German Patent Application No. 102008016663.4-13, 3 pages.

* cited by examiner

LIQUEFIER FOR A HEAT PUMP AND HEAT PUMP

CROSS-REFERENCE TO RELATED APPLICATION

This application is a U.S. National Phase entry of PCT/EP2009/002315 filed Mar. 30, 2009, and claims priority to German Patent Application No. 10 2008 016663.4.2 filed Apr. 1, 2008, each of which is incorporated herein by references hereto.

BACKGROUND OF THE INVENTION

The present invention relates to heat pumps, and particularly to heat pumps that may be employed for supplying a heating cycle and a process water cycle.

WO 2007/118482 discloses a heat pump with an evaporator for evaporating water as the working liquid to produce working vapor. The heat pump further includes a compressor coupled to the evaporator to compress the working vapor. Here, the compressor is formed as a flow machine, wherein the flow machine comprises a radial wheel accepting uncompressed working vapor at its front side and expelling same by means of correspondingly formed blades at its side. By way of the suction, the working vapor is compressed so that compressed working vapor is expelled on the side of the radial wheel. This compressed working vapor is supplied to a liquefier. In the liquefier, the compressed working vapor, the temperature level of which has been raised through the compression, is brought into contact with liquefied working fluid, so that the compressed vapor again liquefies and thus gives off energy to the liquefied working fluid located in the liquefier. This liquefier working fluid is pumped through a heating system by a circulation pump. In particular, a heating flow, at which warmer water is output into a heating cycle, such as a floor heating, is arranged to this end. A heating return then again feeds cooled heating water to the liquefier so as to be heated again by newly condensed working vapor.

This known heat pump may be operated as an open cycle or as a closed cycle. The working medium is water or vapor. In particular, the pressure conditions in the evaporator are such that water having a temperature of 12° C. is evaporated. To this end, the pressure in the evaporator is at about 12 hPa (mbar). By way of the compressor, the pressure of the gas is raised to, e.g., 100 mbar. This corresponds to an evaporation temperature of 45° C. thus prevailing in the liquefier, and particularly in the topmost layer of the liquefied working fluid. This temperature is sufficient for supplying a floor heating.

If higher heating temperatures are required, more compression is adjusted. However, if lower heating temperatures are needed, less compression is adjusted.

Furthermore, the heat pump is based on multi-stage compression. A first flow machine is formed to raise the working vapor to medium pressure. This working vapor at a medium pressure may be guided through a heat exchanger for process water heating so as to then be raised to the pressure needed for the liquefier, such as 100 mbar, e.g. by a last flow machine of a cascade of at least two flow machines. The heat exchanger for process water heating is formed to cool the gas heated (and compressed) by a previous flow machine. Here, the overheating enthalpy is utilized wisely to increase the efficiency of the overall compression process. The cooled gas is then compressed further with one or more downstream compressors or directly supplied to the liquefier. Heat is taken from the compressed water vapor so as to heat process water to higher temperatures than, e.g., 40° C. therewith. However, this does not reduce the overall efficiency of the heat pump, but even increases it, because two successively connected flow machines with gas cooling connected therebetween achieve the demanded gas pressure in the liquefier with a longer life due to the reduced thermal stress and with less energy than if a single flow machine without gas cooling were present.

In heating systems, a process water tank of its own may be arranged, which holds a certain amount of process water which is heated to a certain default warm-water temperature. This process water tank typically is dimensioned so that warm water can be dispensed at default temperature for a certain period of time, e.g. for filling a bathtub. For this reason, a mere flow-type heating principle often is not employed in process water heating when no combustion processes are to be employed for process water heating, but a certain process water volume is kept at the specified temperature instead.

This process water tank should, on the one hand, not be too large, so that its thermal inertia does not become too great. On the other hand, this process water tank should not be too small either, so that a minimum amount of warm water can be tapped quickly, without the temperature of the warm water decreasing significantly, which would detract from the convenience of the heating.

At the same time, the process water tank should be sufficiently insulated, since heat loss via the process water tank is especially disadvantageous. Thus, this heat loss has to be compensated for, to ensure that a sufficiently large amount of warm process water is available at all times. This means that the heating must also operate when there currently is no demand, but when the contents of the process water tank have been cooled due to bad insulation.

This means that the process water tank is to be insulated especially well, which again entails both space for insulating materials and costs of the insulating materials.

Moreover, a heating system, so as to be well accepted on the market, must not be too bulky and should be offered in a form ensuring ease of handling by workmen and builder-owners, and can easily be transported and set up at typical locations, such as in cellars or heating rooms. Special insulation for the process water tank could indeed be built in on location so as to keep the volume of the overall heating system small for transportation and setup on location. On the other hand, each step of later assembly of a heating system leads to costs for the workman and at the same time also to additional fault liability. Moreover, the insulation material needed for insulating the process water tank also is expensive if good insulation effects are to be achieved. However, an insulation effect is important especially for heat pumps to be used in smaller buildings, since such heat pumps are to be used in large numbers and should be optimized for high efficiency, i.e. the ratio of expended energy to extracted energy, so that maximum energy efficiency is achieved on the whole.

SUMMARY

According to an embodiment, a liquefier for a heat pump may have: a liquefier space having a working fluid space filled up to a filling level when liquefied working fluid is filled in, and capable of being filled with gaseous working fluid in a gas region above the filling level; a process water tank formed so that its content is separated from the liquefied working fluid in the working fluid space in terms of liquid, wherein the process water tank has a process water inflow for cold process water and a process water outflow for heated process water, wherein the process water tank is arranged at least partially in the working fluid space, and wherein the process water tank has a wall spaced from a wall of the working fluid space, whereby a gap formed so as to communicate with the gas region and hold at least partially gaseous working fluid in operation is obtained.

According to another embodiment, a heat pump may have: a liquefier for a heat pump as mentioned above; and an evaporator, wherein the evaporator is arranged below the liquefier in a setup direction of the heat pump.

According to another embodiment, a heat pump may have: an evaporator; a liquefier with a liquefier wall; and a gas region extending from the evaporator to the liquefier, wherein the gas region is formed to hold evaporated working fluid in the evaporator, which is liquefied upon entering the liquefier, wherein heat can be given off to liquefied working fluid, wherein the gas region extends along the liquefier wall.

According to still another embodiment, a method of manufacturing a liquefier for a heat pump with a liquefier space having a working fluid space, which is filled up to a filling level when liquefied working fluid is filled in, and which can be filled with gaseous working fluid above the filling level in a gas region, and a process water tank formed so that its content is separated from the liquefied working fluid in the working fluid space in terms of liquid, wherein the process water tank has a process water inflow for cold process water and a process outflow for heated process water, may have the step of: producing the liquefier space and the process water tank so that the process water tank is arranged at least partially within the working fluid space, wherein, in the step of producing, a wall of the process water tank is manufactured such that it is spaced from a wall of the working fluid space, whereby a gap formed to communicate with the gas region and hold at least partially gaseous working fluid in operation is obtained.

According to another embodiment, a method of manufacturing a heat pump with an evaporator, a liquefier with a liquefier wall and a gas region extending from the evaporator to the liquefier, may have the step of: arranging the gas region so that the gas region extends along the liquefier wall.

The present invention is based on the finding that the simplest, and at the same time most efficient accommodation of the process water tank is achieved in the working fluid space of the liquefier. The working fluid space and the process water tank are arranged so that the process water tank has a wall spaced from a wall of the working fluid space. Hence, a gap, which at least partially comprises neither working fluid in liquid form nor process water, but is only filled with vapor, is obtained between these two walls. This vapor may be the same compressed working vapor that is transported into the liquefier from the compressor. This compressed working vapor fills the gap between the process water tank and the working fluid space.

The process water in the process water tank thus is not spaced from the liquid in the liquefier by one wall only, but by two walls and a vapor layer and/or gas layer therebetween.

Since vapor and/or gas have a significantly higher thermal resistance than water and/or the liquefied gas, the process water tank thus is insulated from the content of the working fluid space in the liquefier without any further measures.

In an embodiment, the heat pump is operated with water. As compared with the atmospheric pressure, even compressed vapor, as is present in such a heat pump, has relatively low pressure, such as 100 mbar (100 hPa). Hence, the insulating effect between the process water tank and the liquefied working fluid is increased even more as compared with higher pressures of the vapor. This is due to the fact that the insulating effect of a gas-filled gap becomes greater, the smaller the pressure of the gas becomes, with the best insulating effect being achieved when there is a vacuum in the gap.

In embodiments of the present invention, the process water tank is heated by a heat exchanger guiding warm liquefier liquid through the process water tank in a fluidically insulated manner. Furthermore, the process water tank is formed so as to be heated with an intermediate cooler arranged behind an intermediate stage of a cascade of compressors or behind the last compressor stage. Here, it is of advantage that the process water in the process water tank is guided directly through the intermediate cooler. With this, a surface of the intermediate cooler in contact with overheated vapor is directly cooled by the process water, in order to achieve higher temperatures in the process water tank than otherwise present for heating purposes in the liquefier. By the process water tank directly holding the intermediate cooler liquid, any losses through an additional heat exchanger become unnecessary.

Furthermore, such usage of the process water, which may be drunk, after all, in contrast to heating water, and is therefore hygienic, is uncritical because the liquid volume in the intermediate cooler itself is relatively small.

Furthermore, temperatures substantially higher than the liquefier temperatures are reached in the intermediate cooler due to the overheating properties, which additionally assists in maintaining hygienic conditions in the process water tank.

Usually, the process water tank is provided with a cold water supply and a warm water flow, as well as typically with a circulation pump return.

The arrangement of the process water tank in the liquefier, and particularly in the working fluid space of the liquefier, wherein the process water tank is, however, thermally separated from the working fluid space via a gap filled with gas or vapor, entails several advantages. One advantage is that the process water tank does not need any additional space, but is contained within the volume of the working fluid space. Hence, the heat pump does not have any additional complicated form and is compact. Moreover, the process water tank does not need insulation of its own. This insulation would be necessitated if it was attached at another place. However, the entire working fluid space, and particularly the gap filled with gas and/or vapor, now acts as an inherent insulation. Furthermore, heat losses, which may still occur, are uncritical because the entire heat given off by the process water tank reaches the liquefier itself, where it is often used as heating heat. Real losses are only heat losses to the outside, i.e. to the surrounding air, which do not occur in the process water tank, however.

It is further advantageous that the gas filling for the gap between the wall of the process water tank and the wall of the working fluid space does not have to be specially manufactured. Instead, the working vapor itself, which is present in the liquefier anyway, is used advantageously to this end. Apart from the fact that vapor and/or gas have a better insulation effect than the liquefied vapor, i.e. the water and/or the liquefied gas, the insulation between the process water tank and the working fluid space is especially good when the heat pump works with water as the working fluid, because the pressure in the liquefier, albeit higher than the pressure in the evaporator, is relatively low, such as at 100 hPa, which corresponds to medium negative pressure.

Furthermore, the arrangement of the process water tank in the working fluid space of the liquefier leads to the fact that conduit paths to the working fluid space itself, e.g. for a decoupled heat exchanger, are short. Moreover, conduit paths to a liquid-coupled heater, such as to an intermediate cooler, behind a compressor stage also are short, since the compressor also typically is attached close to the liquefier.

All these properties do not only lead to the fact that the heat pump as a whole becomes more compact and therefore more inexpensive and better to handle, but also to the fact that the losses of the heat pump are minimized further. All the heat losses from the process water actually are no real losses, because the heat only reaches the liquefier space and is beneficial there for heating the heating cycle. Nevertheless, however, it is easily possible, due to the good insulation, to maintain a higher temperature in the process water tank, at least in the upper region, than is present in the liquefied working fluid, because a higher temperature is generated in the intermediate cooler, which temperature is, for example, directly given off to the process water, i.e. without a heat exchanger therebetween, and is fed to the process water tank in the upper region, which is where the warmest layer of the process water tank is located.

In one embodiment, alternatively or additionally, the liquefier is thermally insulated from the outer environment by the gas region. To this end, the gas region, which extends from the evaporator of the heat pump to the liquefier of the heat pump, wherein the liquefier has a liquefier wall, is formed so as to extend along the liquefier wall. Hence, the liquefier does not have to be insulated to the outside any more, because the gas region, in which there is significantly lower pressure than in the liquefier, already has very good insulation properties. Especially when the heat pump is operated with water and the working fluid and typical liquefier temperatures, as are needed for heating buildings, such as ranging from 30 to 60° C., are present in the liquefier, there is very low pressure in the gas region, for example on the order of 50 mbar, which almost represents a vacuum with respect to the environment, which is at 1000 mbar. This "near vacuum" has substantially better insulation properties than a specially employed insulant, such as organic or synthetic insulants. Moreover, this insulation with the gas region saves providing an additional insulant, which entails cost savings on the one hand and space savings and assembly savings on the other hand. Thus, an insulant, which is not needed at all, must be neither bought nor assembled.

BRIEF DESCRIPTION OF THE DRAWINGS

Embodiments of the present invention will be explained in greater detail in the following with respect to the accompanying drawings, in which.

DETAILED DESCRIPTION OF THE INVENTION

Figure 1:
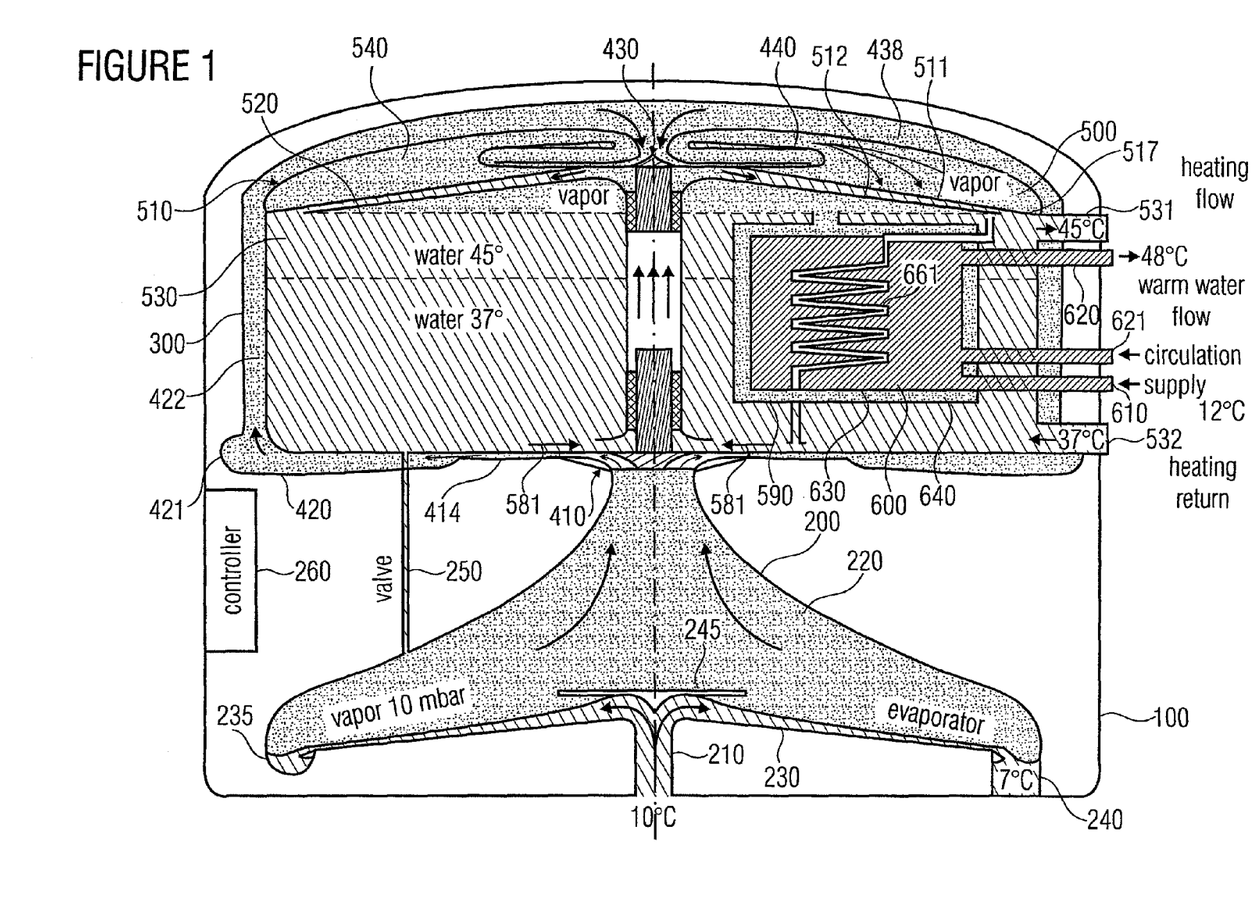
FIG. 1 is a schematic illustration of the heat pump with an evaporator, a compressor and a liquefier including a process water tank.

FIG. 1 shows a schematic cross-sectional view of a heat pump in which a liquefier may be employed advantageously.

The heat pump includes a heat pump housing 100 comprising, in a setup direction of the heat pump from the bottom to the top, first an evaporator 200 and a liquefier 300 above it. Furthermore, a first compressor stage 410 feeding a first intermediate cooler 420 is arranged between the evaporator 200 and the liquefier 300. Compressed gas output from the intermediate cooler 420 enters a second compressor stage 430 and there is condensed and supplied to a second intermediate cooler 440, from which the compressed, but intermediately cooled gas (vapor) is fed to a liquefier 500. The liquefier has a liquefier space 510, which comprises a working fluid space filled with liquefied working fluid, such as water, up to a filling level 520. The liquefier 500 and/or the liquefier space 510 are limited to the outside by a liquefier wall 505, which provides a lateral boundary of the liquefier shown in cross-section in FIG. 1 as well as a lower boundary, i.e. a bottom area of the liquefier shown in FIG. 1. Above the filling level 520, which sets the boundary between the liquefied working fluid 530 and the not (yet) liquefied, but gaseous working fluid 540, there is the gaseous working fluid, which was expelled by the second compressor 430 into the second intermediate cooler 440.

There is a process water tank 600 in the working fluid space 530. The process water tank 600 is formed such that its contents are separated from the liquefied working fluid in the working fluid space 530 in terms of liquid. Furthermore, the process water tank 600 includes a process water inflow 610 for cold process water and a process water outflow or process water flow 620 for warm process water.

According to the invention, the process water tank 600 is arranged at least partially in the working fluid space 530. The process water tank includes a process water tank wall 630 arranged spaced from a wall 590 of the working fluid space so that a gap 640 formed to communicate with the gas region 540 results. Furthermore, the arrangement is such that, in operation, no liquefied working fluid or at least partially no liquefied working fluid is contained in the gap 640. An insulating effect between the water in the process water tank 600 and the liquefied working fluid (such as water) in the working fluid space 530 is obtained already when e.g. the upper region of the gap 640 is full of working fluid vapor and/or working fluid gas, while for some reason the lower region of the gap is filled with working fluid.

In particular, since the liquid of the process water is less in the lower region than in the upper region, it is sufficient anyway, depending on the implementation, to ensure insulation only in the upper region, because it may even be partly favorable for the lower region to have no insulation or only little insulation to the liquefier space. This is due to the fact that the water supply is at about 12° C., or at lower temperatures, particularly in winter when the water from the water conduit is even colder. In contrast, the lower region of the working fluid space will have temperatures of maybe more than 30° C. and may e.g. be even at 37° C. Hence, at least for ensuring that the upper (warmer) region of the process water tank is warmer than the liquefier space, it is uncritical whether the lower region of the process water tank is insulated particularly thickly from the liquefier. Thus, it is not so critical if the lower region is filled with liquefied working fluid, as long as the region of the process water tank where a higher temperature results due to the layering is thermally insulated from the working fluid space 530.

Subsequently, the individual components of the heat pump described in FIG. 1 will be illustrated in greater detail.

In an evaporator inflow 210, liquid working fluid to be cooled is supplied, such as ground water, seawater, brine, river water, etc., if an open cycle takes place. In contrast, also a closed cycle may take place, wherein the liquefied working fluid supplied via the evaporator inflow conduit 210 in this case e.g. is water pumped into the ground and up again via a closed underground conduit. The seal and the compressors are designed such that a pressure that is such that water evaporates at the temperature at which it rises via the inflow conduit 210 forms in an evaporation space 220. So as to let this process take place as well as possible, the evaporator 200 is provided with an expander 230, which may be rotationally symmetrical, wherein it is fed at the center like an "inversed" plate, and the water then flows off from the center outwardly toward all sides and is collected in an also circular collecting trench 235. At one point of the collecting trench 235, an outflow 240 is formed, via which the water cooled by the evaporation and/or the working fluid is pumped down again in liquid form, i.e. toward the heat source, which may for example be the ground water or the soil.

A water jet deflector 245 is arranged so as to ensure that the water conveyed by the inflow conduit 210 does not splash upward, but flows off evenly toward all sides and ensures as efficient an evaporation as possible. An expansion valve 250, by which a pressure difference between both spaces may be controlled, if needed, is arranged between the evaporation space 220 and the working fluid space. Control signals for the expansion valve as well as for the compressors 410, 430 and for other pumps are supplied by an electronic controller 260, which may be arranged at any location, wherein issues like good accessibility from the outside for adjustment and maintenance purposes are more important than thermal coupling and/or decoupling from the evaporation space or from the liquefaction space.

The vapor contained in the evaporation space 220 is sucked by a first compressor stage 410 in a flow as uniform as possible via a shaping for the evaporation space, which narrows from the bottom upward. To this end, the first compressor stage includes a motor 411 (FIG. 6) driving a radial wheel 413 via a motor shaft 412 schematically depicted in FIG. 6. The radial wheel 413 sucks the vapor through its bottom side 413a and outputs the same in a compressed form at its output side 413b. Thus, the now compressed working vapor reaches a first portion of the vapor channel 414, from where the vapor reaches the first intermediate cooler 420. The first intermediate cooler 420 is characterized by a corresponding protrusion 421 for slowing the flow rate of the working gas overheated due to the compression, which may be penetrated by fluid channels, depending on the implementation, as not shown in FIG. 1, however. These fluid channels may, for example, be flown through by heating water, i.e. working fluid water, in the working fluid space 530. Alternatively or additionally, these channels may also be flown through by the cold water supply cycle 610, in order to already obtain preheating for the process water fed into the process water tank 600.

Figure 5:
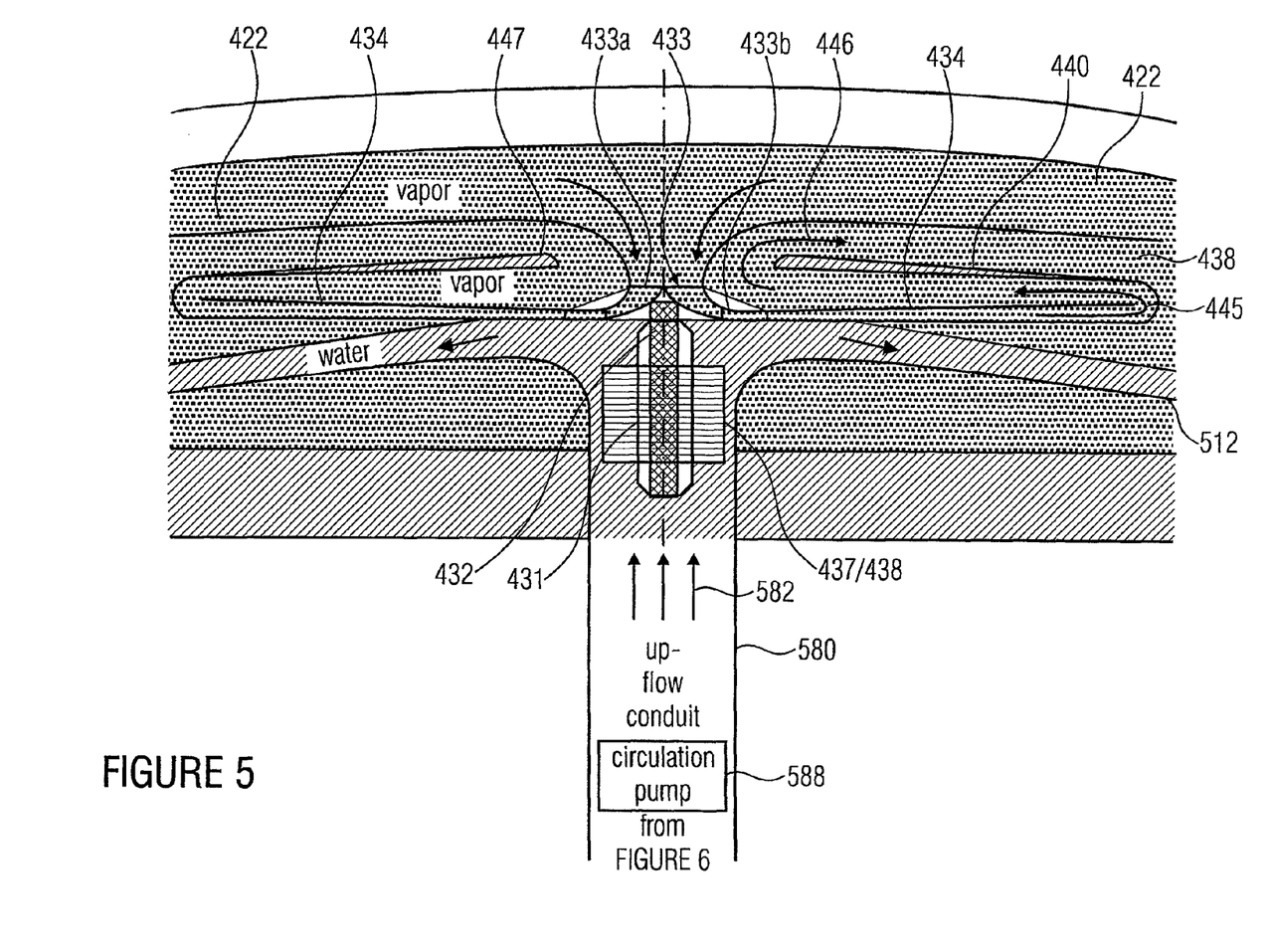
FIG. 5 is an enlarged view of the arrangement of the second compressor stage at the upper end of the up-flow conduit.

In another embodiment, the guiding of the fluid channel 420 around the cold bottom end of the working fluid space 530 of the liquefier 500 acts such that the working fluid vapor, which extends through this relatively long expanded working fluid channel, cools and gives off its overheating enthalpy on its way from the first radial wheel 33 (FIG. 5).

The working fluid vapor flows through the intermediate cooler 420 via a second channel portion 422 into a suction opening 433a of the radial wheel 433 of the second compressor stage and there is fed into the second intermediate cooler 440 laterally at an expulsion opening 433b. To this end, a channel portion 434 is provided extending between the lateral expulsion opening 433b of the radial wheel 433 and an input into the intermediate cooler 440.

The working vapor condensed by the second compressor stage 430 to the liquefier pressure then passes through the second intermediate cooler 440 and is then guided onto cold liquefied working fluid 511. This cold liquefied working fluid 511 is then brought onto an expander in the liquefier, which is designated with 512. The expander 512 has a similar shape to the expander 230 in the evaporator and again is fed by way of a central opening, wherein the central opening in the liquefier is fed by way of an up-flow conduit 580 in contrast to the inflow conduit 210 in the evaporator. Through the up-flow conduit 580, cooled liquefied working fluid, i.e. arranged at the bottom area of the working fluid space 530, is sucked from a bottom area of the working fluid space 530, as indicated by arrows 581, and brought up in the up-flow conduit 580, as indicated by arrows 582.

The working fluid in liquid form, which is cold because it comes from the bottom of the working fluid space, now represents an ideal "liquefaction partner" for the hot compressed working fluid vapor 540 in the vapor space of the liquefier. This leads to the fact that the liquefied working fluid conveyed by the up-flow conduit 580 is heated up more and more by the liquefying vapor on the way on which it flows from the central opening downward toward the edge, so that the water, when it enters the working fluid space filled with liquefied working fluid on the edge of the expander (at 517), heats up the working fluid space.

Liquefied working fluid of the working fluid space 530 is pumped into a heating system, such as floor heating, via a heating flow 531. There, the warm heating water gives off its temperature to the floor or to air or a heat exchanger medium, and the cooled heating water again flows into the working fluid space 530 via a heating return 532. There, it is again sucked via the flow 582 generated in the up-flow conduit 580, as illustrated at the arrows 581, and again conveyed onto the expander 512 so as to be heated again.

Figure 2:
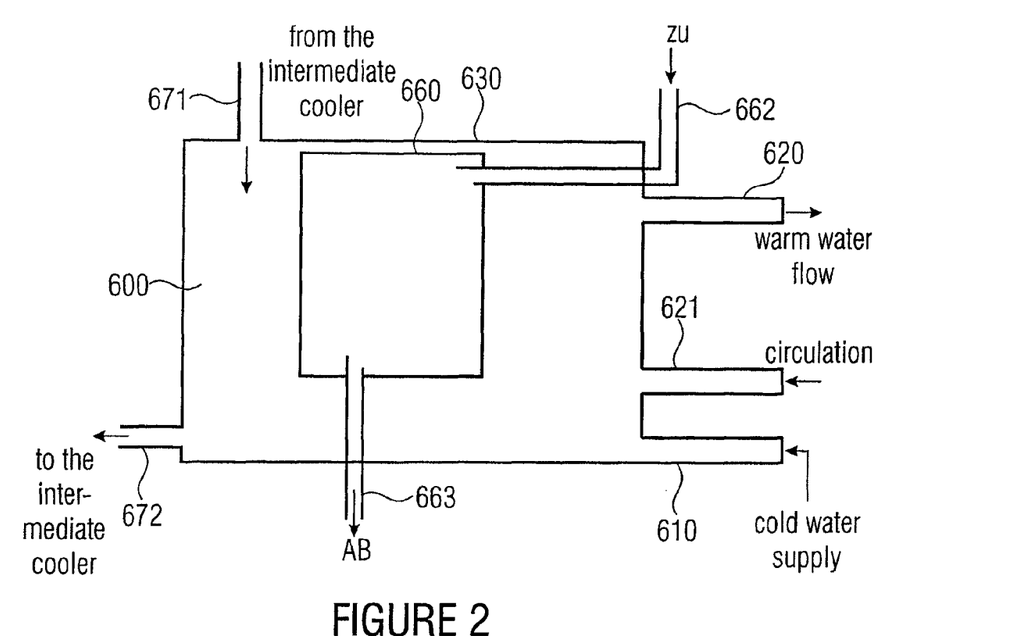
FIG. 2 is a schematic illustration of the process water tank of FIG. 1.

Subsequently, with respect to FIG. 1 and FIGS. 2 and 3, the process water tank 600 will be dealt with in greater detail. Apart from the cold water inflow 610 and the warm water flow 620, the process water tank 600 may further include a circulation return 621, which is connected to the warm water flow 620 and a circulation pump such that, by actuating the circulation pump, it is ensured that preheated process water is present at a process water tap. With this, it is ensured that the tap for warm water does not have to be actuated for a very long time at first until warm water exits the tap.

Furthermore, a schematically drawn process water heater 660, which may, for example, be formed as a heater coil 661 (FIG. 1), is provided in the process water tank. The process water heater is connected to a process water heater inflow 662 and a process water heater outflow 662. The liquid cycle in the process water heater 660 is, however, coupled from the process water in the process water tank, but may be coupled with the working fluid in the working fluid space 530, as illustrated in FIG. 1, in particular. Here, warm liquefied working fluid is sucked, by a pump that is not shown, through the process water heater inflow 662 near the entry location 517, where the highest temperatures are present, into the process water heater 660, transported through it and output again at the bottom, i.e. where the coldest temperatures in the working fluid space 530 are present. A pump that may be used for this may either be arranged in the process water tank itself (but decoupled in terms of liquid) so as to use the waste heat of the pump, or may be provided outside the process water tank in the liquefier space, which is of advantage for reasons of hygiene.

Thus, the process water tank 600 has an upper portion and a lower portion, wherein the heat exchanger 660 is arranged such that it extends more in the lower portion than in the upper portion. The process water heater with its heating coil thus only extends where the temperature level of the process water tank is equal to or smaller than the temperature of the liquefier water. In the upper portion of the process water tank, the temperature will, however, be above the temperature of the liquefier water, so that the heat exchanger with its active region, i.e. its heating coil, for example, does not have to be arranged there.

By way of the process water heater 660, the process water present in the process water tank 600 thus cannot be heated to any higher temperatures than are present at the warmest point in the liquefier, i.e. around the location 517, where the heated working fluid enters the working fluid volume in the liquefier from the expander 512.

A higher temperature is reached by using process water to achieve intermediate cooling of the compressed vapor. To this end, the process water tank includes a connection in its upper region to accommodate process water passed through the intermediate cooler 440, which is at a significantly higher temperature than is present at the location 517. This intermediate cooler outflow 671 thus serves to bring the topmost region of the process water tank 600 to a temperature above the temperature of the liquefied working fluid 530 near the working fluid level 520. Cooled process water and/or supplied cold process water is taken off at the bottom location of the process water tank via the intermediate cooler inflow 672 and supplied to the intermediate cooler 440. Depending on the implementation, the process water is heated not only by the second intermediate cooler 440, but also is heated by the first intermediate cooler 420/421, although this is not illustrated in FIG. 1.

In a usual design of the heat pump, it may be assumed that the intermediate cooling does not provide any such strong heating power for the intermediate cooler cycle alone to be sufficient to generate a sufficient amount of warm water. For this reason, the process water tank 600 is designed to have a certain volume, such that the process water tank is constantly heated to a temperature above the liquefier temperature in normal operation of the heat pump. Thus, a predetermined buffer is present for when a greater amount of water is taken out, such as for a bathtub or for several showers having been had simultaneously or in quick succession. Here, also an automatic process water preference effect occurs. If very much warm water is taken out, the intermediate cooler becomes colder and colder and will remove more and more heat from the vapor, which may well lead to reduced energy the vapor is still capable of giving off to the liquefier water. This effect of preferring the warm water dispensing is, however, desirable because heating cycles typically do not react that quickly, and at the moment at which one would like to have process water warm process water is more important than the issue of whether the heating cycle works slightly more weakly for a short period of time.

However, if the process water tank is fully heated, the process water heater 660 may be deactivated by the electronic controller by stopping the circulation pump. Furthermore, the intermediate cooler cycle may also be stopped via the connections 671, 672 and the corresponding intermediate cooler pump, because the process water tank is at its maximum temperature. However, this is not absolutely necessary, because when the process water tank is fully heated, the energy present there is to some extent reversely fed into the process water heater 660, which now acts as the process water cooler, in order to still advantageously utilize the overheating enthalpy to heat the working fluid space of the liquefier even at its lower, rather cooler location.

The inventive arrangement of the process water tank in the liquefier space and the heating of the process water tank by a process water heater from the liquefier volume and/or by a cycle to an intermediate cooler thus does not necessarily have to be controlled especially tightly, but may even work without control, because preference of the warm water processing takes place automatically, and because, when warm water processing is not necessary, such as at longer periods during the night, the process water tank serves to additionally heat the liquefier further. The purpose of this heating is to be able to maybe even reduce the power consumption of the compressor, without the heating of the building, performed via the heating flow 531 and the heating return 532, falling below its nominal value.

Figure 3:
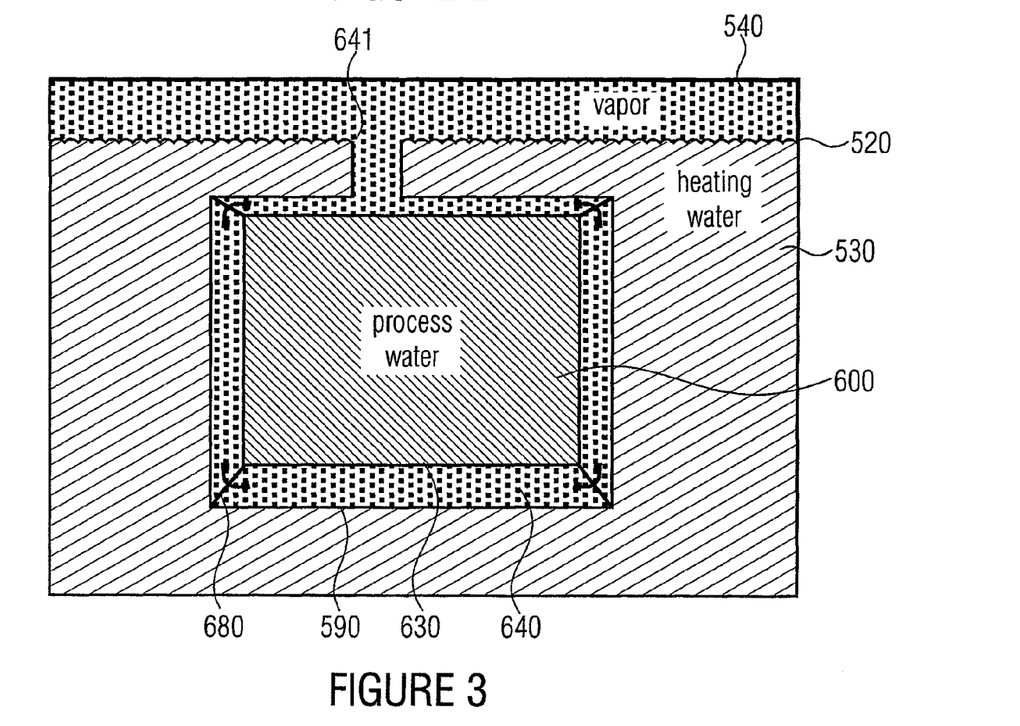
FIG. 3 is an enlarged illustration of the arrangement of the process water tank in the working fluid space.

FIG. 3 shows a schematic illustration of the accommodation of the process water tank 600 in the liquefier space. In particular, it is of advantage for the entire process water tank 600 to be arranged below the filling level 520 of the liquefied working fluid. If the heat pump is designed so that a filling level 520 of the liquefied working fluid may vary, a gap vapor feed 641 may be arranged above the maximum filling level 520 for liquefied working fluid in the working fluid space 530. With this, it is ensured that, even in the case of the maximum filling level 520, no working fluid may enter the gap 640 via the conduit 641. Thereby, vapor is present in the entire space 640, namely the vapor that is also in the region filled with vapor or gas region 540 of the liquefier. The process water tank 600 therefore is arranged by analogy with a thermos bottle in the liquefier, namely below the "water surface".

By analogy with a thermos bottle, in which the inner region into which the liquid to be kept warm is filled is insulated by an evacuated region from the outside surrounding air, the process water tank 600 is insulated from the heating water in the space 530 by a vapor or gas filling, without any solid insulating material in the gap. Even though there is no high vacuum in the gap 640, a significant negative pressure, for example 100 mbar, still is present in the gap 640, particularly for heat pumps operated with water as the working fluid, i.e. operating at relatively low pressures.

The size of the gap, i.e. the shortest distance between the working fluid space wall 590 and the process water tank wall 630, is uncritical with respect to the dimensions and should be greater than 0.5 cm. The maximum size of the gap is arbitrary, but is limited by the fact that an increase of the gap at some point brings along more disadvantages due to less compactness and no longer provides any greater advantages with respect to the insulation. Therefore, it is of advantage to make the maximum gap between the walls 630 and 590 smaller than 5 cm.

Furthermore, it is of advantage to design the liquefier 500 so that the volume of liquefied working fluid, which at the same time represents the heating water storage, ranges from 100 to 500 liters. The volume of the process water tank will typically be smaller and may range from 5% to 50% of the volume of the working fluid space 530.

Furthermore, it is to be pointed out that the cross-sectional illustration in FIG. 1, apart from certain connecting conduits, which are self-explanatory, is rotationally symmetrical. This means that the expander 230 in the evaporator or the expander 512 may be formed, as it were, as an inverted plate in the top view.

Moreover, the vapor channels 414, 422 will extend in a circular way around the entire almost cylindrical space for the liquefied working fluid, which is circular in the top view.

Moreover, also the process water tank may be circular in the top view. The process water tank is arranged in the right half of the working fluid space 530, in the embodiment shown in FIG. 1. Depending on the implementation, however, it could also be arranged in a rotationally symmetrical manner, so that it would extend, as it were, like a ring around the up-flow conduit. Such a large-scale design of the process water tank often is not necessary, however, so that a design of the process water tank in a sector of the working fluid space that is circular in top view is sufficient, wherein this sector may be smaller than 180 degrees.

Figure 4:
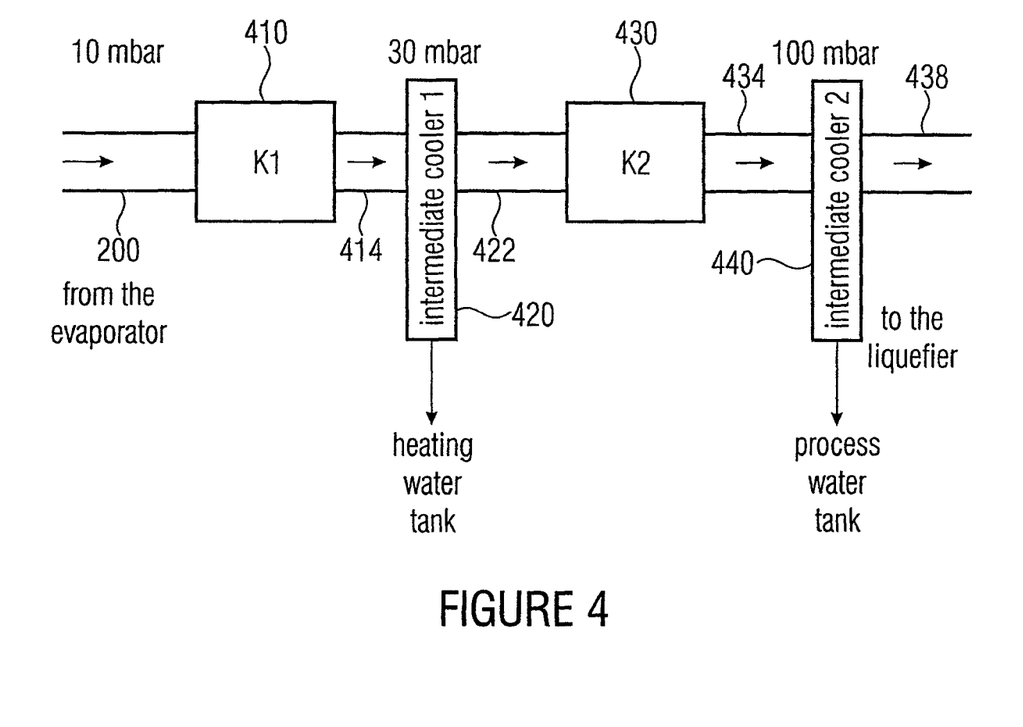
FIG. 4 is a schematic illustration of the compressor/intermediate cooling cascade of FIG. 1.

Subsequently, on the basis of FIG. 4, the compressor cycle with the arranged intermediate coolers will be illustrated in greater detail. In particular, as illustrated on the basis of FIG. 1, evaporated water vapor at low temperature and low pressure, such as at 10° C. and 10 mbar, reaches a first compressor stage 410 which may be implemented by a motor with an associated radial wheel via the evaporation conduit 200. It is already to be noted that the motor for driving the radial wheel according to the invention is arranged in the up-flow conduit 580, as will still be illustrated in greater detail and has already been explained in FIG. 6. At the output of the first compressor 410, also referred to as K1 in FIG. 4, vapor is fed into the vapor channel 414. This vapor has a pressure of about 30 mbar and typically has a temperature of about 40° C. due to the overheating enthalpy. This temperature of about 40° C. is now being removed from the vapor, without significantly affecting its pressure, via the first intermediate cooler 420.

The intermediate cooler 420, which is not shown in FIG. 1, includes e.g. a conduit arranged in thermal coupling to the surface of the expansion 421 and in the area of the gas channel 414 so as to remove energy from the vapor there. This energy may be used to heat the working fluid space 530 of the liquefier or to already heat part of the process water tank, such as the lower part, if the process water tank is designed as a layered reservoir. In this case, a further inflow originating from the first intermediate cooler would not be arranged at the top in the process water tank, but roughly in the middle of the process water tank. Alternatively, however, cooling of the gas to the temperature or near the temperature prevailing in the working fluid space already takes place by guiding the channels 414 and 422 along the working fluid space when the wall of the working fluid space is formed to be non-insulating, as it is of advantage.

Then, the gas, which is at the medium pressure of 30 mbar but is now cooled again, reaches the second compressor stage 430, where it is compressed to about 100 mbar and output into the gas output conduit 434 at a high temperature, wherein this temperature may be at 100-200° C. The gas is cooled by the second intermediate cooler 440, which heats the process water tank 600 via the connections 671, 672, as has been illustrated, but without significantly reducing the pressure. The compressed gas, now reduced in its overheating enthalpy, is supplied to the liquefier to heat the heating water, wherein the "channel" between the output of the intermediate cooler 440 and the liquefier expander 512 is designated with the reference numeral 438.

Subsequently, on the basis of FIG. 5, the more detailed construction of the second compressor stage 430 and the interaction with the second intermediate cooler 440 will be illustrated. The radial wheel 433 of the second compressor compresses the gas supplied via the channel 422 or, when the heat pump is operated with water, the vapor supplied via the channel 422 to a high temperature and a high pressure and outputs the heated and compressed vapor into the vapor output conduit 434, where the vapor then enters the second intermediate cooler 440, which is formed so that the gas has to take a relatively long path around this intermediate cooler, such as the zigzag path indicated by arrows 445, 446. This shaping for the path of the gas in the intermediate cooler may easily be achieved by plastic injection-molding methods.

The intermediate cooler has a middle intermediate cooler portion 447, which may be penetrated by piping not shown in FIG. 5. Alternatively, the middle portion 447 may be completely hollow and be flown through by process water to be heated in the sense of a flat conduit, in order to achieve the maximum heating effect possible. Corresponding conduits for process water may also be provided at the exterior walls in the intermediate cooler portion such that, in the intermediate cooler 440, there is a surface as cool as possible for the gas flowing through the intermediate cooler 440, so that as much thermal energy as possible can be given off to the circulating process water, in order to achieve, in the process water tank, a temperature significantly above the temperature in the liquefier space.

It is to be pointed out that the intermediate cooler 440 may also be formed alternatively. Indeed, several zigzag paths may be provided, until the gas may then enter the intermediate cooler output conduit 438 so as to be able to finally condense. Moreover, any heat exchanger concepts may be employed for the intermediate cooler 440, but wherein components flown through by process water are of advantage.

Figure 7:
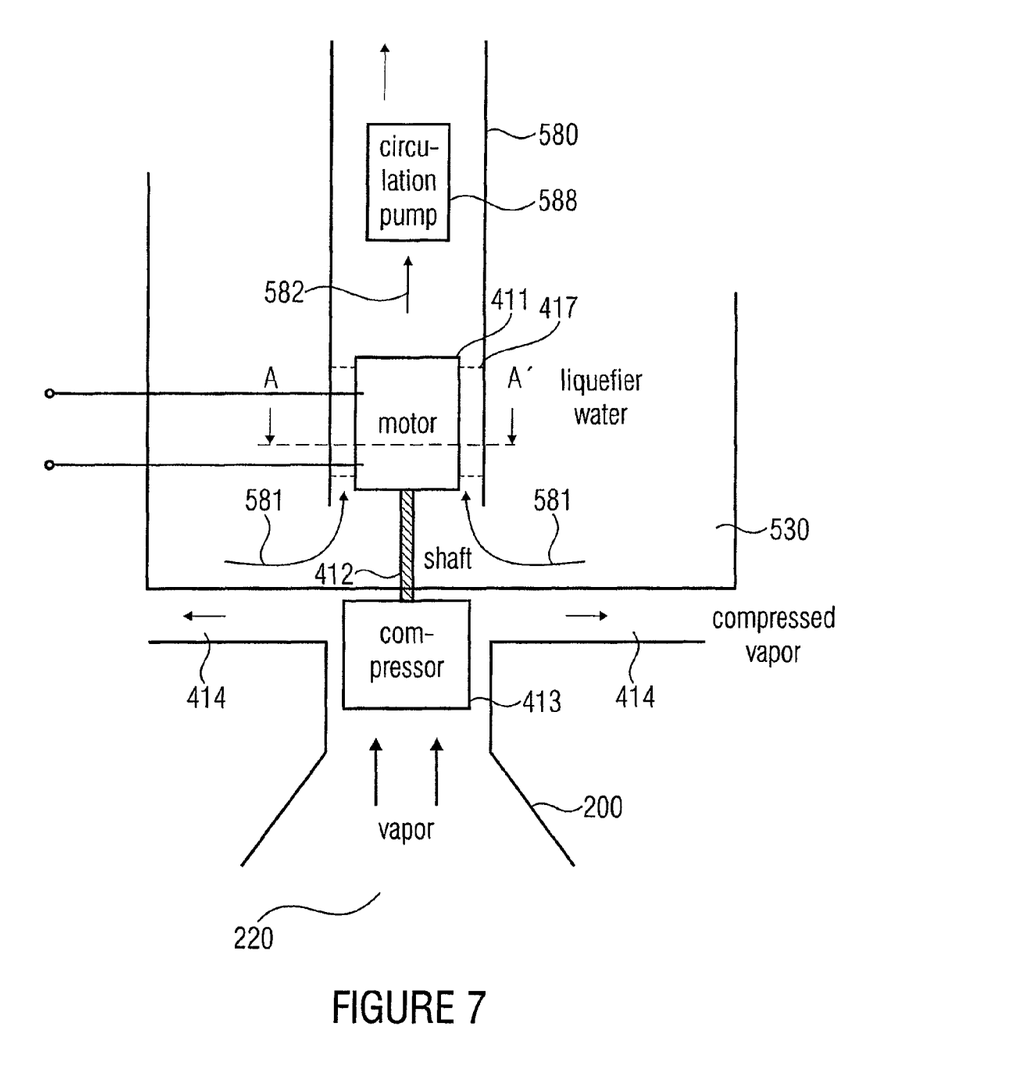
FIG. 7 is a schematic illustration of an arrangement of a compressor motor in the up-flow conduit.

Subsequently, with reference to FIG. 7, the arrangement of the compressor motor in the up-flow conduit 580 will be illustrated. FIG. 7 shows the motor 411, which drives a motor shaft 412, which in turn is connected to an element 413 designated as compressor. The element designated as compressor 413 may be a radial wheel, for example. However, any other rotatable element sucking vapor at low pressure on the input side and expelling vapor at high pressure on the output side may be used as a compression element. In the arrangement shown in FIG. 7, only the compressor 413 is arranged, i.e. the rotatable compression member in the vapor stream extending from the space 220 to the vapor channel 414. The motor and a substantial part of the motor shaft, i.e. the elements 411 and 412, are not, however, arranged in the vapor medium, but in the liquefier space for liquefied working fluid, such as liquefier water, wherein this working fluid space is designated with 530. By way of the arrangement of the motor in the liquefier water, the motor waste heat, which also develops in highly low-loss motors, favorably is not given off to the environment in a useless way, but to the liquefied heating fluid to be heated itself. This liquefied heating fluid itself provides—as seen from the other side—good cooling for the motor so that the motor does not overheat and suffer damage.

The arrangement of the motor in the liquefier, and particularly in an up-flow conduit of the liquefier, also has another advantageous effect. In particular, inherent sound insulation is achieved in that the motion exerted by the motor on the surrounding liquefied working fluid does not result in the entire working fluid being set into motion, because this would then lead to sound generation. This sound generation would entail additional intensive sound-proofing measures, which again entails additional cost and additional effort, however. Yet, if the motor 411 is arranged in the up-flow conduit 580 or, generally speaking, in a cylindrical pipe, which does not necessarily have to be an upstream conduit, movement of the working fluid generated by movement of the motor does not lead to any noise generation outside the liquefier at all, or only to very reduced noise.

The reason for this is that, although the working fluid is set to motion within the up-flow conduit and/or within the cylindrical object due to the mounting of the motor and to potentially additionally present cooling fins of the motor, this motion is not transferred to the liquefied working fluid surrounding the cylindrical pipe due to the wall of the cylindrical pipe. Instead, the entire noise-generating motion of the working fluid remains contained within the pipe, because the pipe itself may be turned back and forth due to its cylindrical shape, but does not generate any significant motion in the liquefier water surrounding the pipe by this back and forth rotation. For a more detailed illustration of this effect, reference is made to FIG. 8 in the following, with FIG. 8 illustrating a cross-section along the line A-A' of FIG. 7.

Figure 8:
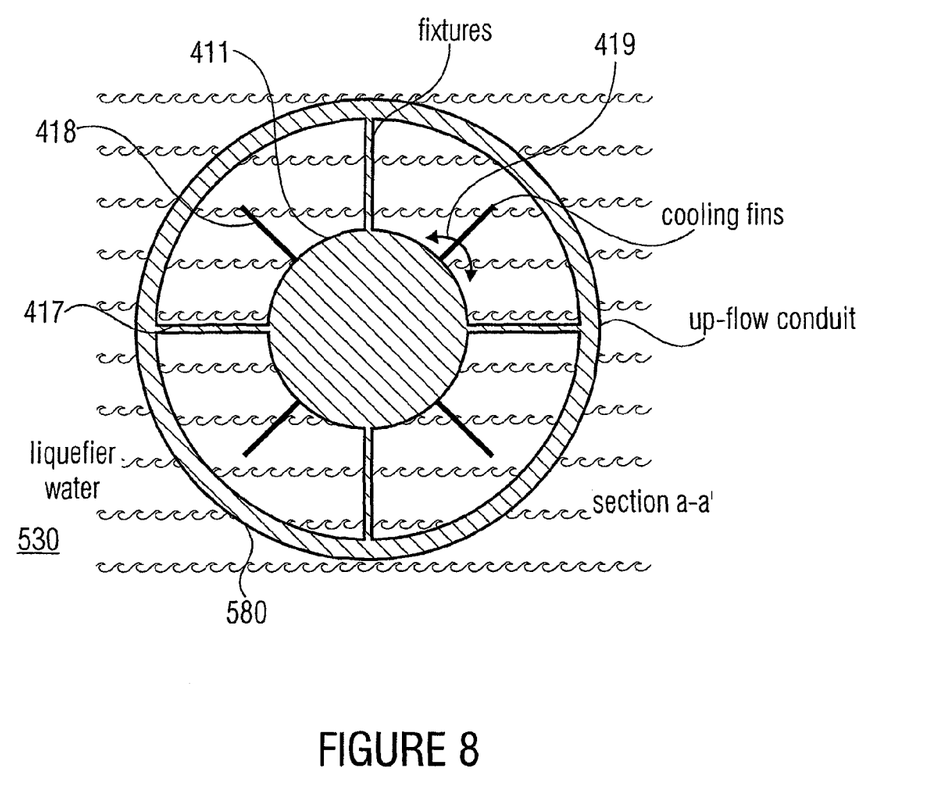
FIG. 8 is a cross-section through the up-flow conduit with fixtures and additional cooling fins.

FIG. 8 shows a pipe, which is the up-flow conduit 580, in one embodiment. A motor body 411, which is illustrated only by way of example to have a circular cross-section, is arranged in the pipe. The motor body 411 is held in the pipe 580 by fixtures 417. Depending on the implementation, only two, three or, as shown in FIG. 8, also four fixtures, or even more fixtures may be employed. In addition to the fixtures, cooling fins 418 may also be employed, which are attached in sectors formed by the fixtures 417, and particularly centered and/or uniformly distributed there, in order to achieve an optimum and well-distributed cooling effect.

It is to be pointed out that the fixtures 417 may also act as cooling fins, and that all cooling fins 418 may at the same time also be formed as fixtures. In this case, the material for the fixtures 417 may be a material of good thermal conductance, such as metal or plastics filled with metal particles.

The pipe 580 itself is also mounted within the liquefier by suspensions, leading to the motor being supported safely via the pipe.

Vibrations of the motor 411 may lead to motion of the motor around its axis, as illustrated at 419. This leads to the fact that strong motion is exerted on the liquefied working fluid within the pipe 580, because the cooling fins and fixtures act, so to speak, as "oars". This motion of the liquefied working fluid, however, is limited to the region within the pipe 580, and no corresponding excitation of the liquefier water outside the pipe 580 is achieved. This is due to the fact that, although the pipe 580 has such "oars" on the inside because of the motor fixtures 417 and the cooling fins 418, the pipe 580 may have a smooth surface on the outside, which may be round, too. Hence, the pipe glides on the outside liquefier water due to the vibrational movement 419 without causing any disturbance in the outside liquefier water 530, and hence without generating disturbing sound. Such a disturbance only exists within the cross-section of the pipe 580 and does not reach the surrounding liquid in the liquefier as a disturbing wave from there.

Although an arrangement of the motor in a corresponding pipe having fixture fins and/or cooling fins on the inside already leads to sound containment, it is further of advantage to use the pipe 580 as an up-flow conduit at the same time, so as to achieve space-saving and efficient multi-functionality. The up-flow conduit 580 serves to transport cooled liquefier water into a region also reached by vapor that is to condense so as to give off its energy into the liquefier water as much as possible. To this end, cold liquefied working fluid is transported from the bottom up in the liquefier space. This transport is through the up-flow conduit, which may be arranged centrally, i.e. in the middle of the liquefier space, and feeds the expander 512 of FIG. 1. The up-flow conduit may, however, also be arranged in a decentralized manner, as long as it is surrounded by liquefier water in an area as large as possible, and advantageously completely.

So as to make the liquefier water flow through the up-flow conduit 580 from the bottom upward, a circulation pump 588, as drawn in FIG. 7, for example, is provided in the up-flow conduit. The circulation pump may similarly be arranged with fixtures on the up-flow conduit, although this is not shown in FIG. 7. Yet, the designs of the circulation pump are uncritical, because it does not have to provide such high compression power and/or rotational speeds. Simple operation of the circulation pump at low rotational speeds, however, already leads to the liquefier water flowing from the bottom up, namely along the flow direction 582. This flow leads to the heat generated in the motor 411 being removed, namely so that the motor is cooled with liquefier water that is as cold as possible. This does not only apply for the motor of the lower, first compressor 410, but also for the motor of the upper, second compressor 430.

Figure 6:
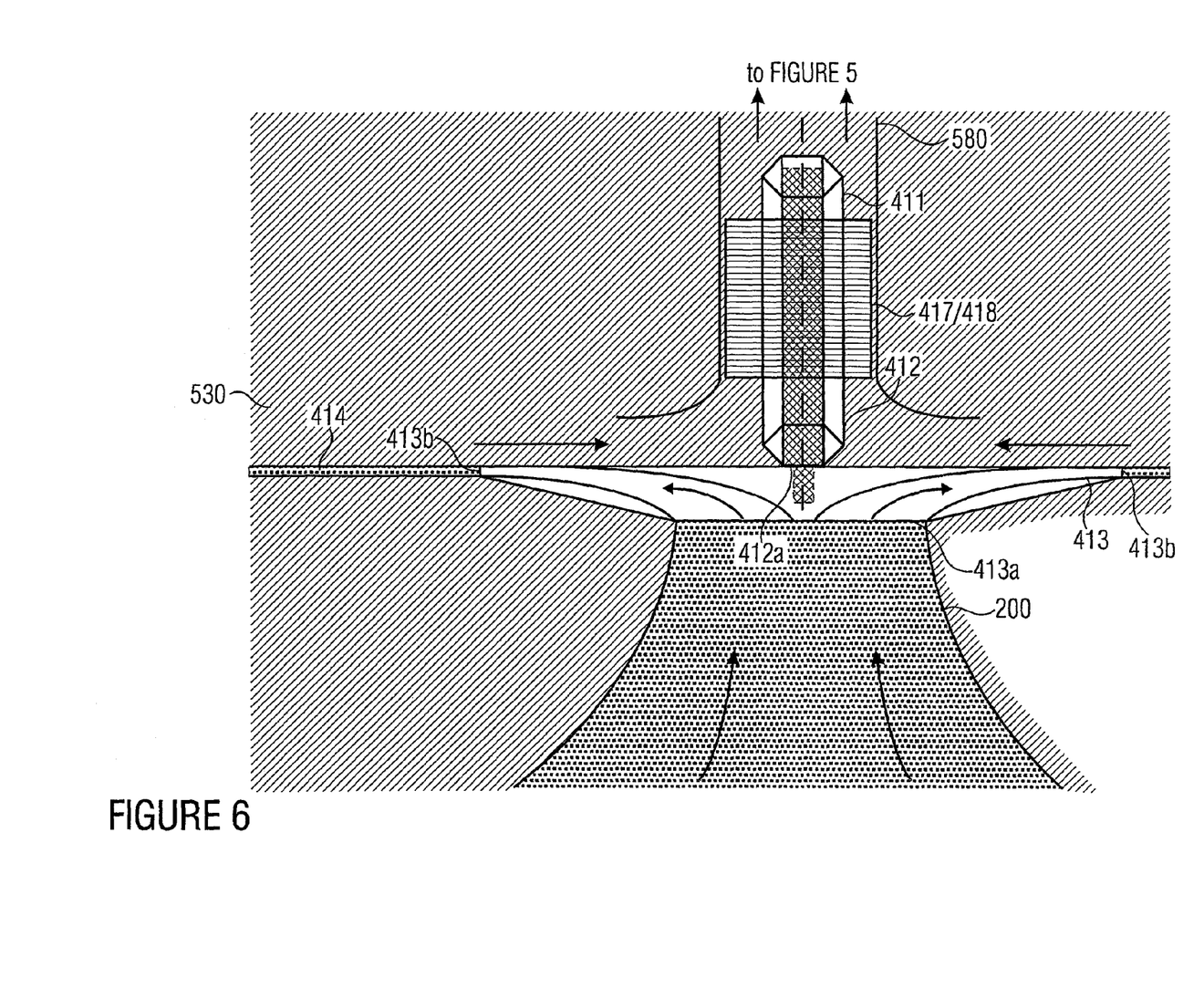
FIG. 6 is an illustration even further enlarged as compared with FIG. 5 of the arrangement of the first compressor stage at the bottom end of the up-flow conduit.

In the embodiment shown in FIG. 6, the motor shaft 412 pierces the bottom of the liquefier space so as to drive the compressor arranged below the bottom of the liquefier space, i.e. the radial wheel 413 exemplarily shown in FIG. 6. To this end, the passage of the shaft through the wall, drawn at 412a, is formed as a sealed passage such that no liquefier water from above enters the radial wheel. The requirements for this seal are relaxed by the fact that the radial wheel 413 gives off the compressed fluid laterally and not at the top, so that the upper "lid" of the radial wheel already is sealed anyway, and thus there is enough space for generating an effective seal between the channel 414 and the liquefier space 530. Another case, which is shown in FIG. 5, is similar. The radial wheel 433 there again lies in the gas channel, whereas the motor is in the region of the liquefier, which is filled with liquefied working fluid, i.e. with water, for example.

In particular, the functionality of the circulation pump 588 leads to water conveyed through the up-flow conduit impinging on the lower boundary of the radial wheel. By way of this "impinging", the water will flow, as it were, toward all sides across the upper expander 512. Yet, no water from the water flow located on the expander 512 is to enter the gas channel 434, of course. For this reason, the shaft 432 of the upper motor 431 may also again be sealed, again with much space remaining for the seal. Just like in the case of the lower motor, this is due to the fact that the lower boundary of the radial wheel 433 again is sealed anyway, i.e. is impermeable for both liquefied working fluid and evaporated working fluid. The compressed evaporated working fluid is expelled laterally and not downwardly with respect to FIG. 5. Hence, the sealing requirements of the shaft 432 again are relaxed due to the large area available.

The heat pump according to the invention includes the evaporator 200, the liquefier 500 with the liquefier wall 505, as well as the gas region, which may include the interior of the evaporator, which is shown at 220, as well as the gas channel between the first compressor 410 and the second compressor 430, and which may also include the vapor region behind the second compressor 430, which is present above the liquefier. This gas region extends from the evaporator 200 to the liquefier 500, wherein the gas region is formed to hold working fluid evaporated in the evaporator, which is then liquefied upon entering the liquefier, wherein heat may be given off to the liquefier and/or to the liquefied working fluid, which is arranged in the liquefier in operation. As shown in FIG. 1, the gas region extends along the liquefier wall. The liquefier wall has a bottom area and a lateral area, and the gas region extends both along the bottom area and along the lateral area in the embodiment shown in FIG. 1. Although the gas region completely surrounds the portion of the liquefier more in contact with the liquefied working fluid on the inside of the liquefier, a significant effect through saving insulation material already is achieved when at least 70% of the entire liquefier wall, which is in contact with the working fluid at a normal operating level of the liquefied working fluid, is in contact with evaporated working fluid on the other side. When water is used as the working fluid, in particular, the pressure in the gas region is so low that there is almost a vacuum in the gas region in terms of pressure, which has a very significant insulation effect by analogy with the thermos bottle.

FIG. 1 shows a cross-section through the heat pump in vertical direction. If the heat pump were sectioned in horizontal direction, for example at half the height of the liquefier, the liquefier would have a round cross-section surrounded by a ring, wherein the entire ring represents the gas channel and/or gas region. In one embodiment, the liquefier is cylindrical, so that the horizontal cross-section is an annular cross-section. Forms other than cylindrical ones with an elliptical cross-section are also advantageous, however. Moreover, two compressors are employed advantageously, namely the compressor 410 as well as the compressor 430, and the gas region extending around the liquefier includes the gas region arranged between the first compressor 410 and the second compressor 430, such that the liquefier acts as an intermediate cooler and therefore reduces overheating of the vapor due to the first compressor, without hereby introducing losses.

The heat pump according to the present invention thus combines diverse advantages, due to its efficient construction. At first, due to the fact that the liquefier is arranged above the evaporator, the vapor will move from the evaporator upwardly in the direction of the first compressor stage. Due to the fact that vapor tends to rise anyway, the vapor will perform this movement due to the compression already, without the additional drive.

It is a further advantage that the vapor is guided a long path along the liquefier after the first compressor stage. In particular, the vapor is guided around the entire liquefier volume, which entails several advantages. On the one hand, the overheating enthalpy of the vapor exiting the first evaporator is given off favorably directly to the bottom wall of the liquefier, at which the coldest working fluid is located. Then the vapor flows, as it were, from the bottom upward against the layering in the liquefier into the second compressor. With this, intermediate cooling is achieved virtually automatically, which may be enhanced by an additional intermediate cooler, which can be arranged in a constructively favorable manner, because enough space remains on the external wall.

Furthermore, the vapor channel 422 and/or 414, which surrounds the entire space with liquefied working fluid, which is, after all, the heating water reservoir, acts as an additional insulation to the outside. The vapor channel thus fulfils two functions, namely cooling toward the liquefier volume on the one hand, and insulation to the exterior of the heat pump on the other hand. According to the principle of the thermos flask, the entire liquefier space again is surrounded by a gap, which now is formed by the vapor channel 414 and/or 422. In contrast to the gap 640, in which there is higher vapor pressure, the vapor pressure in the channel 422 and/or 414 is even lower and is, e.g., in the range of 30 hPa or 30 mbar if water is used as the working fluid. By the liquefier thus being surrounded by a vapor channel operating in the medium pressure range, particularly good insulation thus is achieved inherently, without additional insulation effort. The exterior wall of the channel may be insulated to the outside. However, this insulation can be made substantially cheaper as compared with the case in which the liquefier would have to be insulated directly to the outside.

Furthermore, due to the fact that the vapor channel may extend around the entire working fluid volume, a vapor channel with a large cross-section and little flow resistance is obtained such that, in the case of a very compact design of the heat pump, a vapor channel having a sufficiently large effective cross-section is created, which leads to the fact that no friction losses, or only very small ones, develop.

Furthermore, the use of two evaporator stages, which may be arranged below the liquefier and above the liquefier, respectively, leads to the fact that both evaporator motors may be accommodated in the liquefier working fluid volume, so that good motor cooling is achieved, wherein the cooling waste heat at the same time serves for heating the heating water. Moreover, by arranging the second evaporator above the liquefier, it is ensured that as-short-as-possible paths to condensing may be achieved from there, wherein a part of this path that is as large as possible is utilized by a second intermediate cooler for removing the overheating enthalpy. This leads to the fact that almost the entire vapor path which the vapor covers after exiting the second compressor is part of the intermediate cooler, wherein, when the vapor exits the intermediate cooler, condensation takes place immediately, without having to take further, potentially lossy paths for the vapor.

The design with a circular cross-section both for the evaporator and for the liquefier allows for employing a maximum-size expander 230 for the evaporator and at the same time a maximum-size expander 512 for the liquefier, while still achieving a good and compact construction. With this, it is made possible that the evaporator and the liquefier can be arranged along an axis, wherein the liquefier may be arranged above the evaporator, as it has been explained, whereas an inverted arrangement may, however, be used depending on the implementation, but with the advantages of the large expanders still remaining.

Although it is of advantage to operate the heat pump with water as the working fluid, many described embodiments are also achieved with other working liquids that are different from water in that the evaporation pressure, and hence the liquefier pressure, are higher altogether.

Although the heat pump has been described such that the heating flow 531 and the heating return 532 directly heat a floor heating system, for example, i.e. an object to be heated, a heat exchanger such as a plate heat exchanger may be provided alternatively such that a heating cycle is decoupled from the liquefied working fluid in the working fluid space in terms of liquid.

Depending on the implementation, it is of advantage to produce the heat pump, and substantial elements thereof, in plastics injection-molding technology, for cost reasons in particular. Here, arbitrarily-shaped fixtures of the up-flow pipe on the wall of the liquefier, or the process water tank on the liquefier, or of heat exchangers in the process water tank, or of special shapes of the second intermediate cooler 440, in particular, may be achieved. In particular, the mounting of the motors on the radial wheels may also take place in one operation process, such that the motor housing is injection-molded integrally with the up-flow pipe, with then only the radial wheel being "inserted" in the completely molded liquefier, and particularly in the stationary motor part, without still necessitating many additional mounting steps for this.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A liquefier for a heat pump, comprising:
   a liquefier space comprising a working fluid space filled up to a filling level when liquefied working fluid is filled in, and capable of being filled with gaseous working fluid in a gas region above the filling level;

a process water tank formed so that the water tank content is separated from the liquefied working fluid in the working fluid space in terms of liquid, wherein the process water tank comprises a process water inflow for cold process water and a process water outflow for heated process water, wherein the process water tank is arranged at least partially in the working fluid space, and wherein the process water tank comprises a wall spaced from a wall of the working fluid space, and a gap formed so as to communicate with the gas region and hold at least partially gaseous working fluid in operation is acquired.

2. The liquefier according to claim 1, wherein the liquefier space comprises:

a separate liquefier region arranged in a flow of heated and compressed gaseous working fluid; and a liquefier circulation pump arranged to transport liquefied working fluid into the liquefier region.

3. The liquefier according to claim 2, wherein the gas region extends around the liquefier region.

4. The liquefier according to claim 1, wherein the process water tank comprises a heat exchanger through which liquefied working fluid separated from the process water in terms of liquid can be pumped, wherein the heat exchanger can be fed through an inflow arranged more closely to the filling level of the liquefied working fluid than an outflow of the heat exchanger.

5. The liquefier according to claim 1, wherein the process water tank is arranged in the working fluid space such that more than 75% of an outer surface of the process water tank is arranged below the filling level.

6. The liquefier according to claim 1, wherein the process water tank is cylindrical or conical.

7. The liquefier according to claim 1, comprising an up-flow conduit arranged in the working fluid space so as to be surrounded by liquefied working fluid when the liquefied working fluid is filled in the working fluid space, and extending from a lower region of the working fluid space to an upper region of the working fluid space.

8. The liquefier according to claim 7, wherein a circulation pump is arranged in the up-flow conduit so as to convey colder liquefied working fluid from the lower region to the upper region, wherein the upper end leads into a liquefier region.

9. The liquefier according to claim 7, wherein a motor portion of a compressor is arranged in the up-flow conduit so that a conveying wheel driven by the motor portion is not in contact with the liquefied working fluid, but that a motor shaft extends through an opening of the liquefier in a sealed manner.

10. The liquefier according to claim 9, wherein the opening is at a lower end of the liquefier and is sealed, so that the motor shaft can rotate, but substantially no liquefied working fluid exits through the opening.

11. The liquefier according to claim 9, wherein the opening is at an upper end of the up-flow conduit through which the motor shaft extends, wherein the opening is formed such that liquefied working fluid does not disturb a conveying effect of the compressor.

12. The liquefier according to claim 9, wherein the motor portion is mounted to the up-flow conduit by fixtures.

13. The liquefier according to claim 12, wherein the motor portion comprises a round or angled shape in cross section, wherein a plurality of fixtures extend in a manner offset from the motor portion over a circumference across an interior of the up-flow conduit to a wall of the up-flow conduit, wherein an outer shape of the up-flow conduit is round.

14. The liquefier according to claim 12, wherein at least three fixtures are arranged, wherein the fixtures are arranged so that an angle range between two adjacent fixtures for all adjacent pairs of fixtures is the same within a tolerance range of +/−20 degrees.

15. The liquefier according to claim 1, wherein a channel is present for compressed gaseous working fluid, wherein the channel is thermally coupled to the liquefied working fluid so that the compressed gaseous working fluid gives off heat to the liquefied working fluid when the liquefied working fluid is filled in the working fluid space when the compressed gaseous working fluid moves along the channel.

16. The liquefier according to claim 15, wherein part of the channel extends along a lower end of the liquefier and another part of the channel extends from the bottom upward at a lateral end of the working fluid space.

17. The liquefier according to claim 1, wherein a compressor is arranged so as to compress gaseous working fluid prior to liquefying, wherein the compressed gaseous working fluid is guided through an intermediate cooler, wherein the intermediate cooler comprises a flow and a return formed to communicate with an inflow for heated process water and an outflow for cool process water.

18. The liquefier according to claim 17, wherein the process water inflow is arranged in an upper region of the process water tank, and the outflow to the intermediate cooler is arranged in a lower region of the process water tank.

19. The liquefier according to claim 1, wherein the process water tank comprises an outflow for warm process water, an inflow from a circulation pump for warm process water, and an inflow for cold process water.

20. The liquefier according to claim 1, wherein, on average, the gap is larger than 0.5 cm and smaller than 10 cm.

21. The liquefier according to claim 1, wherein the process water tank is mounted to the wall of the working fluid space by retaining fins, wherein the retaining fins are formed so that they comprise openings for a passage of gas.

22. The liquefier according to claim 1, wherein the process water tank comprises a heat exchanger through which liquefied working fluid separated from the process water in terms of liquid can be pumped, wherein the heat exchanger can be fed through an inflow arranged more closely to the filling level of the liquefied working fluid than an outflow of the heat exchanger, wherein the process water tank comprises an upper portion and a lower portion, and wherein the heat exchanger is arranged so that it extends more in the lower region than in the upper region.

* * * * *